United States Patent
Rastogi et al.

(10) Patent No.: US 8,862,899 B2
(45) Date of Patent: Oct. 14, 2014

(54) STORAGE ACCESS AUTHENTICATION MECHANISM

(75) Inventors: Aseem Rastogi, Fremont, CA (US); Lintu Thomas, Fremont, CA (US); Christopher Del Signore, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 80 days.

(21) Appl. No.: 13/585,720

(22) Filed: Aug. 14, 2012

(65) Prior Publication Data

US 2013/0212386 A1 Aug. 15, 2013

Related U.S. Application Data

(60) Provisional application No. 61/529,207, filed on Aug. 30, 2011.

(51) Int. Cl.
*H04L 29/06* (2006.01)
*H04L 9/32* (2006.01)

(52) U.S. Cl.
CPC .............. *H04L 63/0471* (2013.01); *H04L 9/32* (2013.01); *H04L 9/3263* (2013.01)
USPC ........... 713/189; 713/168; 713/193; 380/229; 380/232

(58) Field of Classification Search
CPC .................................................. H04L 63/0471
USPC ........................................................ 713/189
See application file for complete search history.

(56) References Cited

U.S. PATENT DOCUMENTS

| | | | |
|---|---|---|---|
| 6,711,679 B1 * | 3/2004 | Guski et al. | 713/156 |
| 6,823,453 B1 * | 11/2004 | Hagerman | 713/162 |
| 7,281,126 B2 * | 10/2007 | Smith et al. | 713/2 |
| 8,005,969 B2 * | 8/2011 | Miyazawa et al. | 709/229 |
| 8,190,921 B1 * | 5/2012 | Harwood et al. | 713/193 |
| 8,391,494 B1 * | 3/2013 | Serenyi | 380/278 |
| 8,595,460 B2 * | 11/2013 | Bhat et al. | 711/170 |
| 2003/0200247 A1 * | 10/2003 | Banzhaf et al. | 709/1 |
| 2007/0282747 A1 * | 12/2007 | Shen et al. | 705/51 |

* cited by examiner

*Primary Examiner* — Mohammad L Rahman
(74) *Attorney, Agent, or Firm* — Wong, Cabello, Lutsch, Rutherford & Brucculeri, L.L.P.

(57) ABSTRACT

In embodiments according to the present invention an encryption switch is used to authorize access to LUNs from client VMs present in the cloud provider network. The encryption switch includes responder side software for an authentication protocol and an agent in the client VM includes the requestor side of the authentication protocol. The certificate of the client is securely provided to the encryption switch, which associates the client VM with the LUN. The client private key is securely provided to the client VM, which retains it only non-persistently. The client VM requests LUN access and performs an authentication handshake with the encryption switch. If successful the client VM than has access to the LUN. As the original certificate is linked to the client, if the client is itself a VM, should the client be moved to a different host, the certificate moves with it and LUN accessibility is maintained.

8 Claims, 10 Drawing Sheets

STORAGE ACCESS AUTHENTICATION MECHANISM

CROSS REFERENCE TO RELATED APPLICATIONS

This application claims the benefit under 35 U.S.C. §119 (e) of U.S. Provisional Patent Application Ser. No. 61/529,207 entitled "Public Cloud Data at Rest Security and Storage Access Authentication Mechanism," filed Aug. 30, 2011, which is hereby incorporated by reference.

This application is also related to U.S. patent application Ser. No. 13/585,725, entitled "Public Cloud Data at Rest Security", filed concurrently herewith, which is incorporated by reference.

BACKGROUND OF THE INVENTION

1. Field of the Invention

The invention relates to secure access to data storage, and more particularly to data storage provided over a public network.

2. Description of the Related Art

As IT departments are increasingly placed under tighter budget constraints, cloud infrastructure, either private or public, is being employed to help keep costs down. One of the key inhibitors to adoption of cloud technology (in particular public cloud technology) is the concern of the exposure of customer data as it travels through, and is hosted in, the cloud provider's infrastructure. Although many different mechanisms exist for securing customer data in the cloud there are large areas for improvement. In particular, security of data at rest in the cloud is a big concern with potential cloud customers. Within that category, customers are particularly concerned about unauthorized access to their data.

Today in SAN (storage area network) environments, the main mechanisms for ensuring authorized access to logical unit numbers (LUNs) (the most common unit of storage) are provided by the file system (usually at the file level), zoning in the SAN fabric, and LUN masking on the target side. These solutions are generally acceptable in a single-tenant environment where the ultimate owner of the data is comfortable with allowing his storage and server administrators to setup the access control. However, in a multi-tenant public cloud environment, customers are much less comfortable with relinquishing this control to the cloud provider. Also, in the public cloud environment, there is greater opportunity for a rogue agent executing on the shared infrastructure to thwart these security mechanisms. Also, use of these mechanisms makes configuration and use of mobility services like VMWare Vmotion much more difficult. For example, LUN masking performed on the target requires the identification of a host by its WWPN. Only hosts with configured WWPNs are authorized to access a particular LUN. In a virtual machine (VM) mobility scenario, it is not always the case that VM maintains the same WWPN when it moves. To handle this issue, Storage Administrators may "open up" their LUN masking to allow the full set of WWPNs for all possible hosts in the infrastructure, thereby increasing their security perimeter for the LUN.

SUMMARY OF THE INVENTION

In embodiments according to the present invention an encryption switch is used to authorize access to LUNs from client VMs present in the cloud provider network. The encryption switch includes responder side software for an authentication protocol and an agent in the client VM includes the requestor side of the authentication protocol. The certificate of the client is securely provided to the encryption switch, which associates the client VM with the LUN. The client private key is securely provided to the client VM, which retains it only non-persistently. The client VM requests LUN access and performs an authentication handshake with the encryption switch. If successful, the client VM than has access to the LUN. As the original certificate is linked to the client, if the client is itself a VM, should the client be moved to a different host, the certificate moves with it and LUN accessibility is maintained.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION OF THE PREFERRED EMBODIMENTS

The preferred embodiment provides a mechanism that requires a host or virtual machine to authenticate itself before it can access a logical unit of storage. This additional level of authentication provides a much stronger level of protection of a customer's data than that of previous mechanisms. The embodiment includes adding a service to an encryption at rest switch, such as the Brocade Encryption Switch from Brocade Communications Systems, Inc., see also U.S. Patent Appln. Pub. No. 2011/0038479, published Feb. 17, 2011, which is incorporated by reference, called a "Cloud Credentials Service" (CCS). The CCS is a software module that resides on the encryption switch that provides the responder side of an authentication protocol (like DH-CHAP) for authenticating a VM for access to a LUN that has been configured through the encryption switch. When the cloud provider's client configures a LUN for encryption within a Cloud Crypto Domain, as described in the related application entitled "Public Cloud Data at Rest Security" incorporated above, the client identifies which entities (VMs) that should be allowed to access the LUN. This identity can be in the form of an X.509 certificate that is particular to the VM that will be accessing the LUN. Different authentication protocols can be used (e.g., TLS certificate authentication or DH-CHAP), and credentials information can optionally be kept on an external RADIUS server.

The client's VM image is combined with a "Cloud Crypto Agent" (CCA). The CCA is a software module that is linked to a client's VM image to provide authentication for access to storage objects. It runs the requester side of a TLS or DH-CHAP-like algorithm for authenticating access to storage. The CCA contains, or has access to, the VM's credentials for accessing LUNs (i.e. X.509 certificates). The authentication protocol may be assisted by supporting code in the host bus adaptor (HBA) driver of the host that is hosting the client VM.

Figure 9:
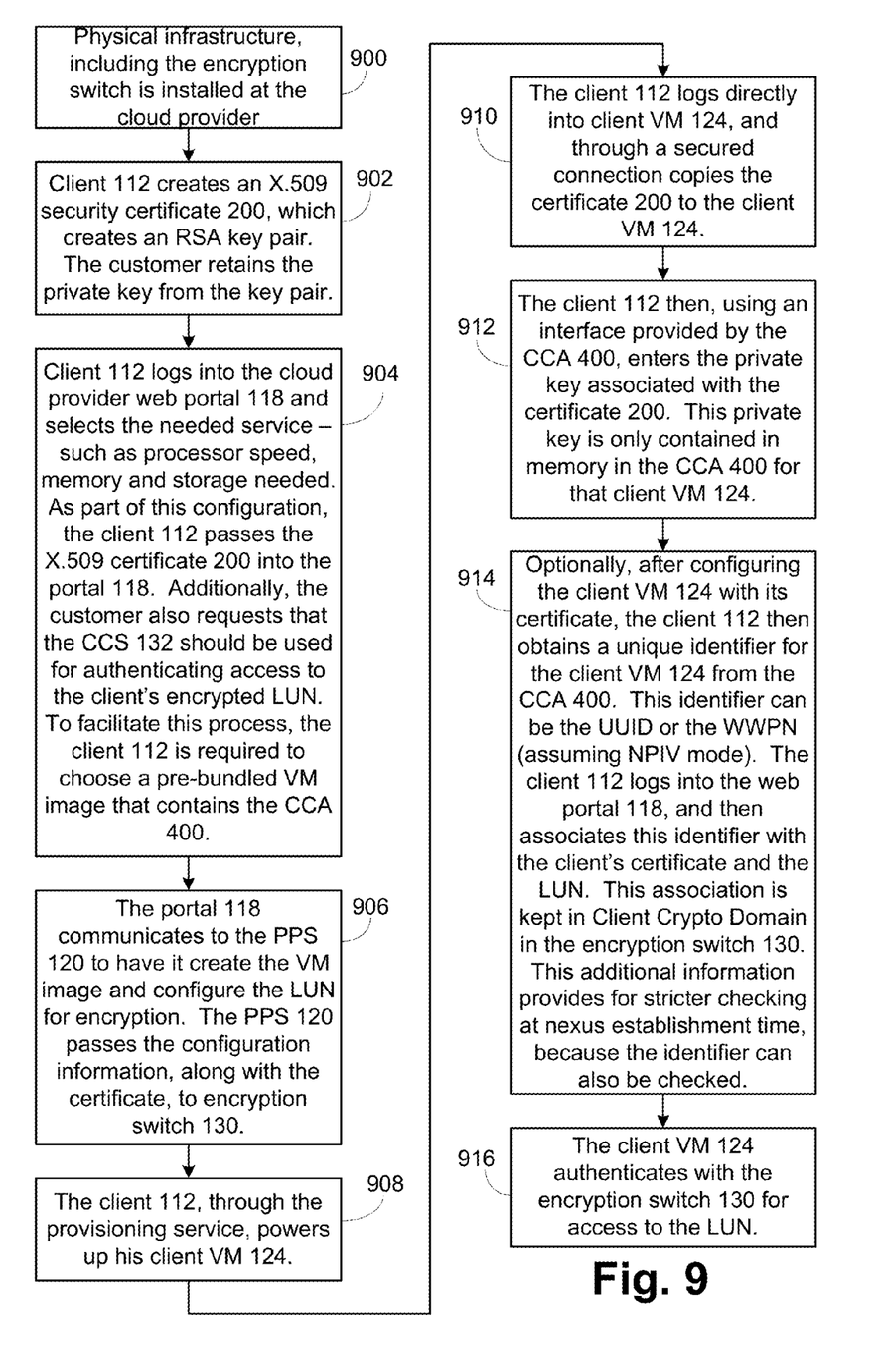
FIG. 9 is a flowchart of client VM instantiation according to the present invention.

The configuration steps for setting up the CCA and the CCS are provided in FIG. 9.

Figure 1:
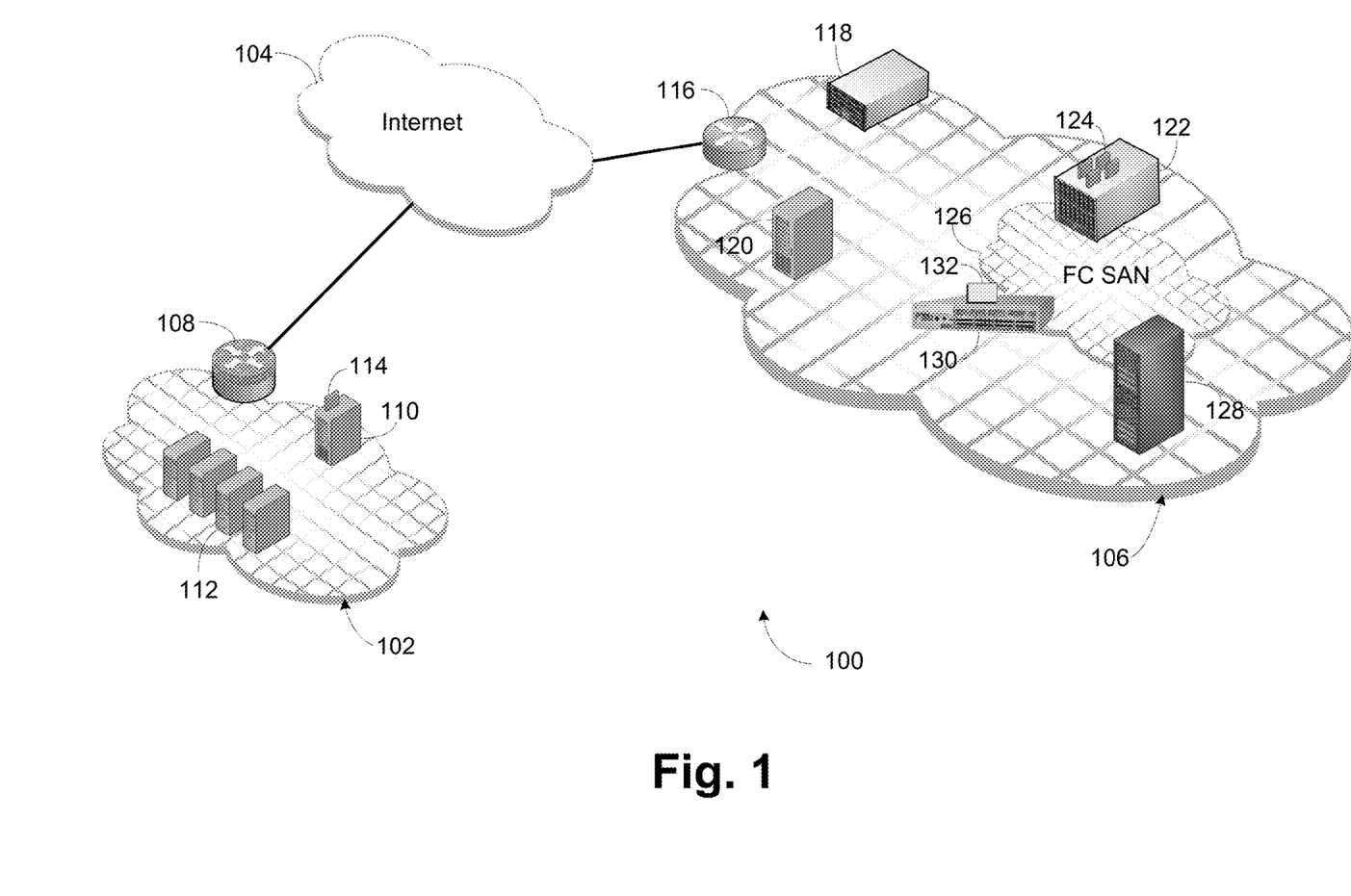
FIG. 1 is a block diagram of an environment according to the present invention.

In step 900 the physical infrastructure, including the encryption switch, is installed at the cloud provider. The preferred embodiment of the infrastructure is illustrated in FIG. 1. The environment 100 includes three basic network areas, the client network 102, a WAN network 104 such as the Internet and a cloud provider network 106. A firewall and router 108 connect the client network 102 to the WAN 104. A client server 110 and individual clients 112 are provided in the client network 102. A VM-based crypto key vault 114 executes on the client server 110.

The cloud provider network 106 is connected to the WAN 104 using a router 116. Present inside the cloud provider network 106 are a web portal 118, which is the web interface for the cloud services; a provider provisioning service 120, which handles the management of the cloud infrastructure; a server 122 which includes a plurality of client VMs 124, storage 128 which contains the LUNs and the encryption switch 130 with its included CCS 132. The use of an encryption switch 130 is preferred because it saves several hops between a normal switch and an encryption appliance and simplifies routing, but a regular switch and an encryption appliance can be used if desired as long as the encryption appliance is in the path from the client VM to the LUN and the added hops are acceptable. The server 122, the storage 128 and the encryption switch 130 are preferably connected using a Fibre Channel storage area network (SAN) 126. The remainder of the communications inside the cloud provider network 106 are generally handled using Ethernet-based local area networks (LANs).

Figure 2:
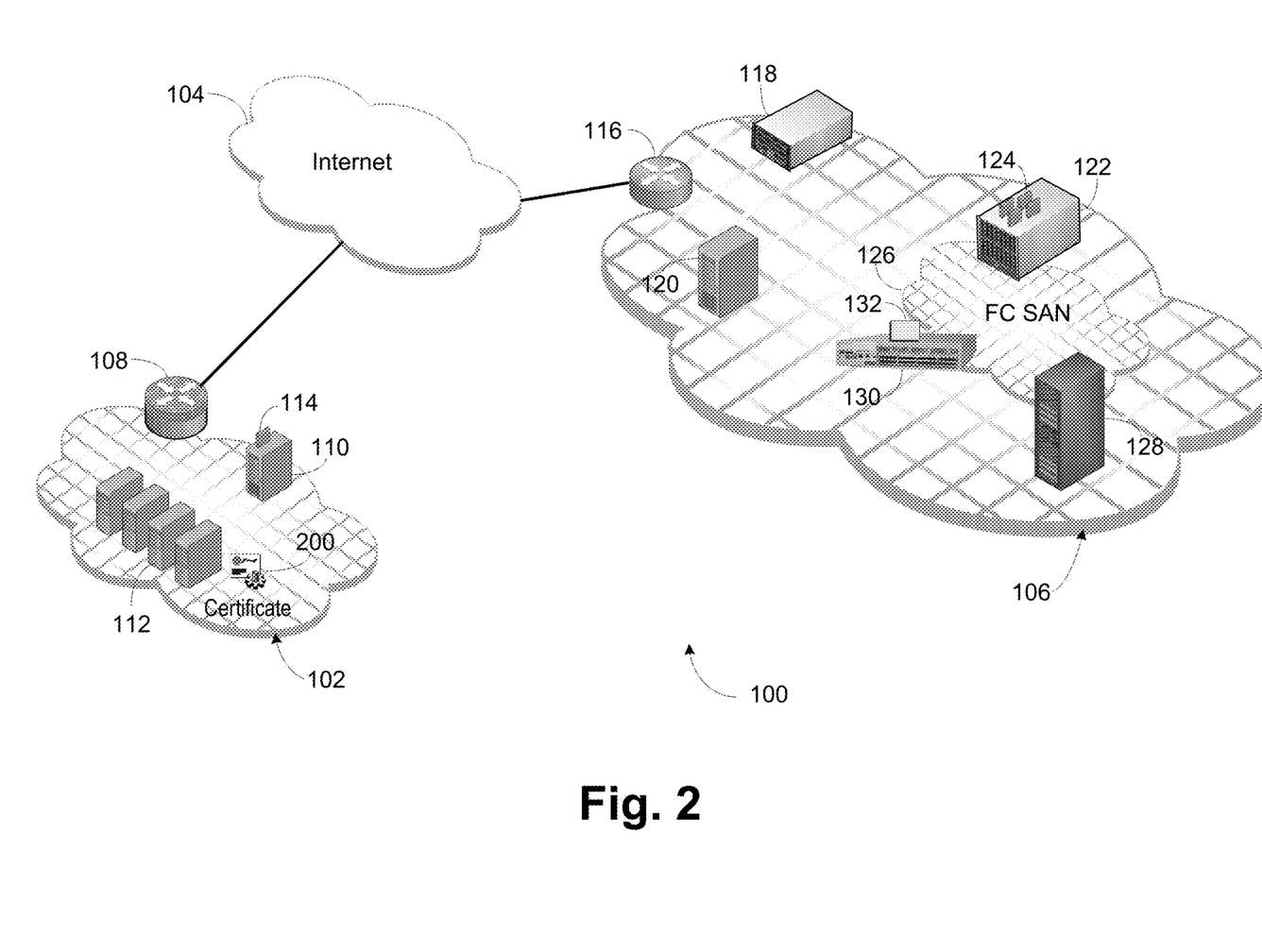
FIGS. 2-7 are illustrations of various operations according to the present invention in the environment of FIG. 1.

Returning to FIG. 9, in step 902 the client 112 creates an X.509 security certificate 200, which creates an RSA key pair. This is illustrated in FIG. 2. The customer retains the private key from the key pair. This certificate 200 is used to authenticate the client's VM 124 to the LUN.

Figure 3:
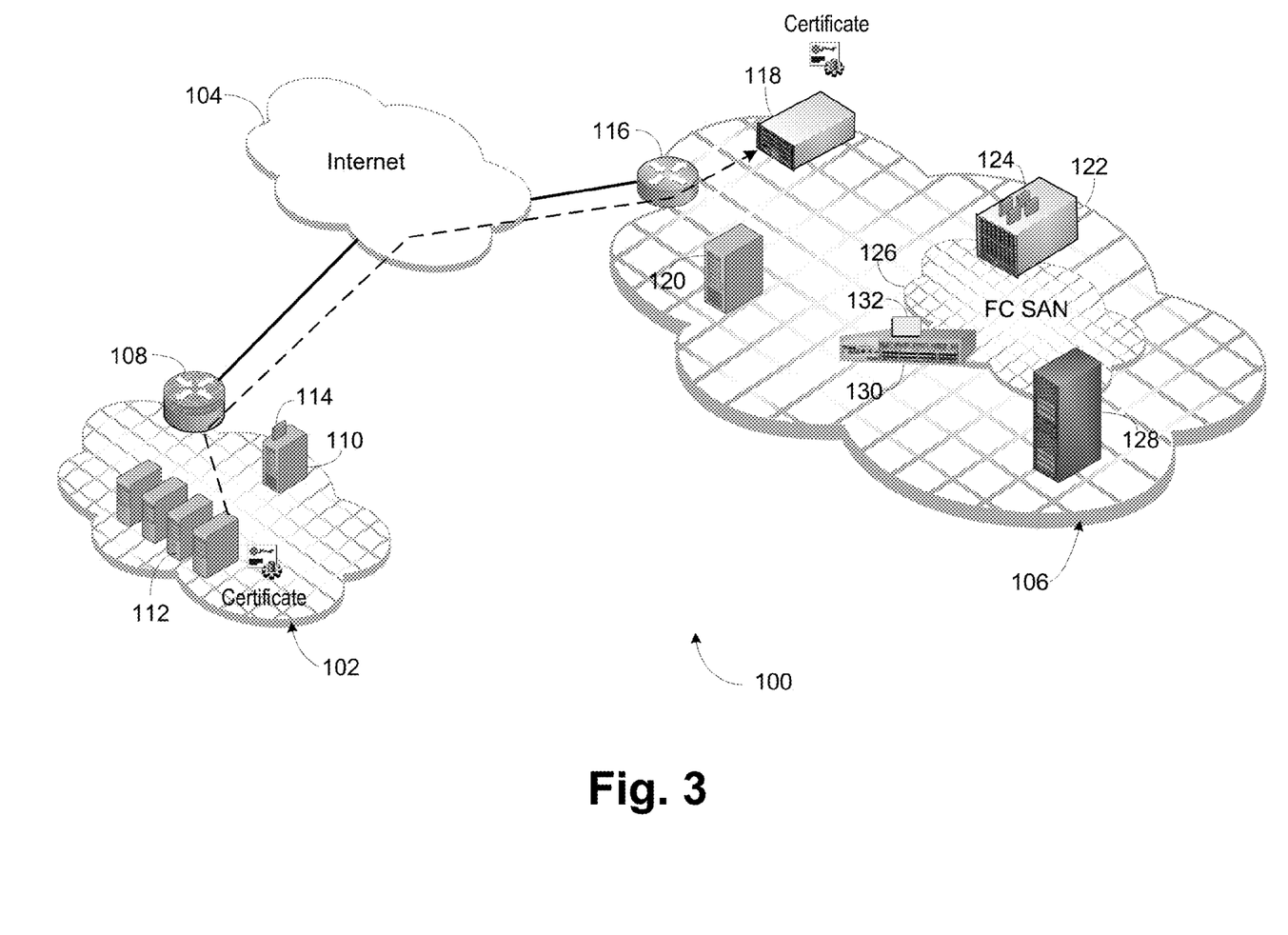

In step 904 the client 112 logs into the cloud provider web portal 118 and selects the needed service, such as processor speed, memory and storage needed. As part of this configuration, the client 112 passes the X.509 certificate 200 into the portal 118. This is illustrated in FIG. 3, with the dashed line representing the encrypted path between the client 12 and the portal 118. Additionally, the customer also requests that the CCS 132 should be used for authenticating access to the client's encrypted LUN. To facilitate this process, the client 112 is required to choose a pre-bundled VM image that contains a Cloud Credentials Agent (CCA) 400.

Figure 4:
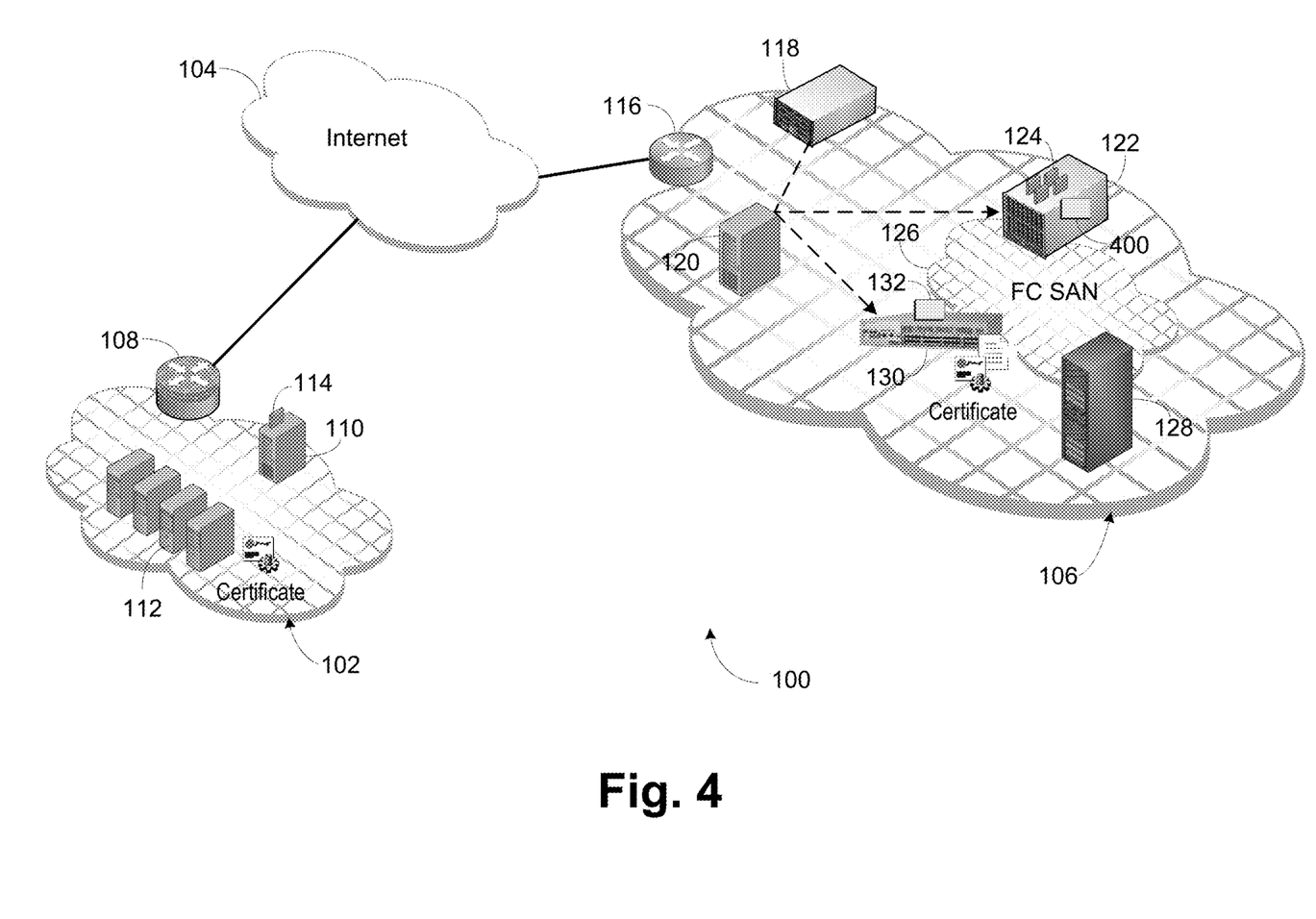

In step 906 the portal 118 communicates to the provider provisioning service (PPS) 120 to have it create the VM image and configure the LUN for encryption. The PPS 120 passes the configuration information, along with the certificate 200, to the encryption switch 130. This is illustrated in FIG. 4, with the dashed lines representing the encrypted paths between the PPS 120 and the client VM 124 and the encryption switch 130. With that, the encrypted LUN is now associated with the client VM's certificate inside the Cloud Crypto Domain of the client.

Figure 5:
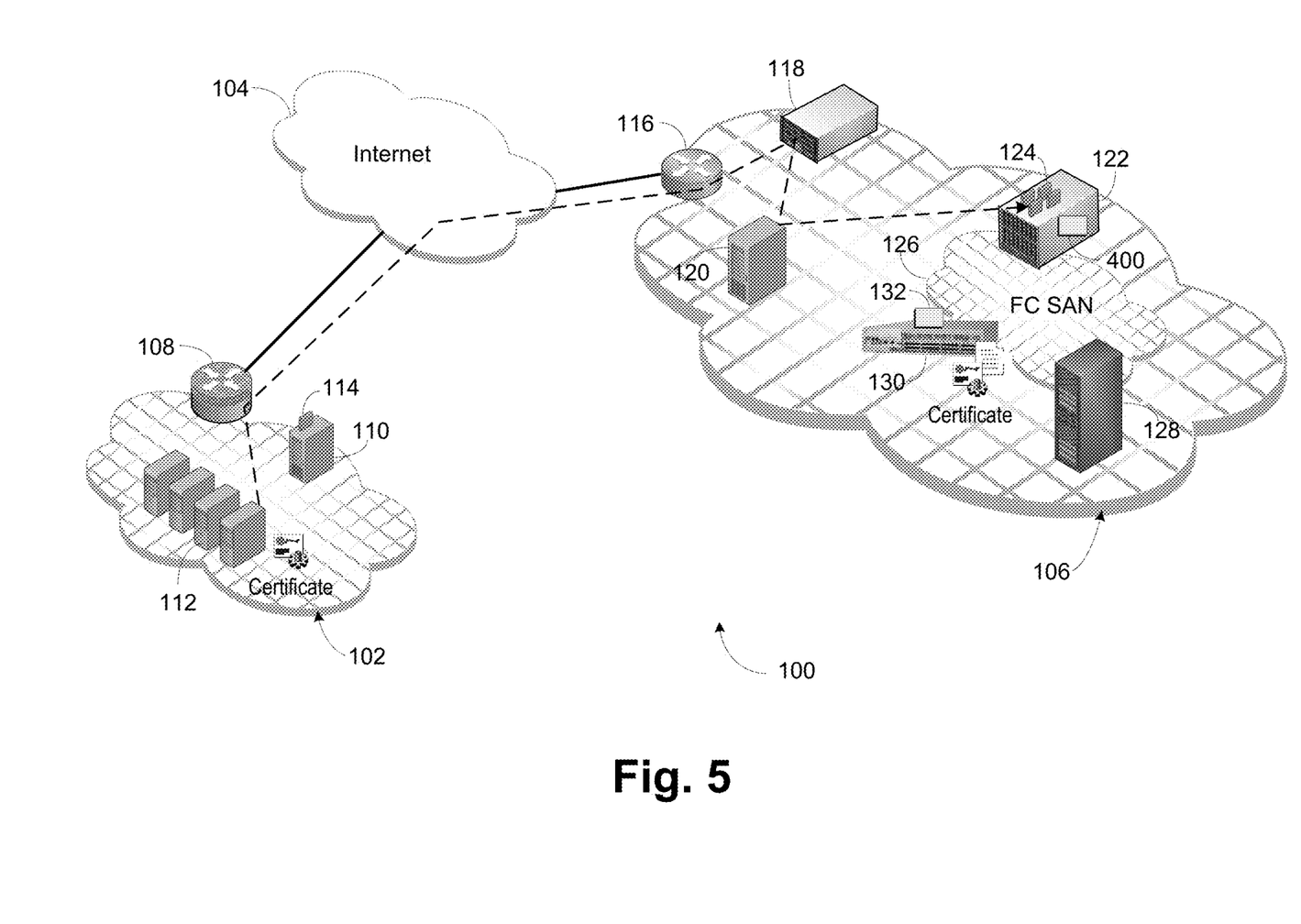

In step 908 the client 112, through the PPS 120, powers up the client VM 124. In step 910 the client 112 logs directly into the client VM 124, and through a secured connection (e.g. SSH) copies the certificate 200 to the client VM 124. This is illustrated in FIG. 5, with the dashed line representing the encrypted path between the client 112 and the client VM 124.

Figure 6:
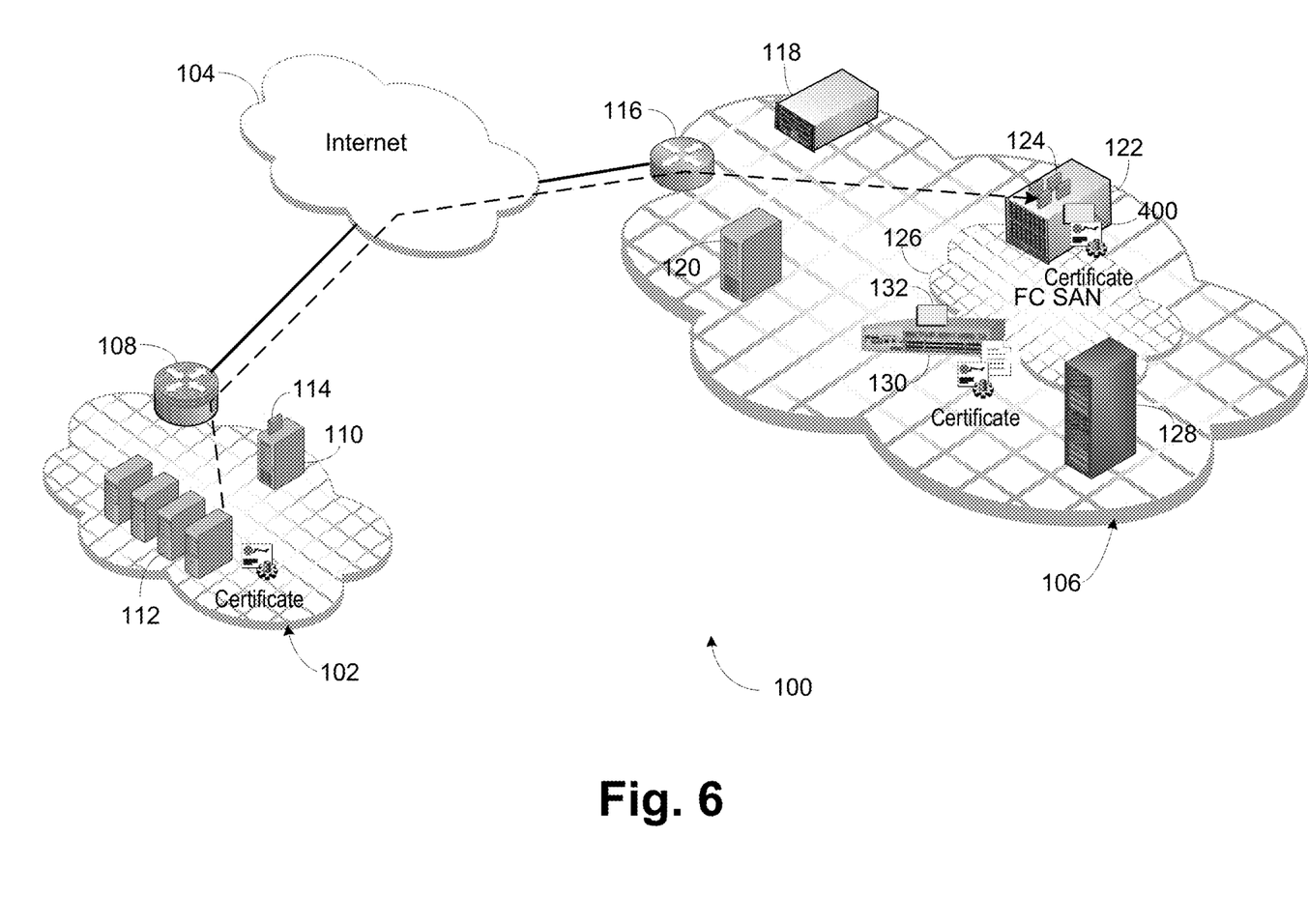

In step 912 the client 112 then, using an interface (e.g. command line interface) provided by the CCA 400, enters the private key associated with the certificate. This private key is only contained in memory in the CCA 400 for that client VM 124. This is illustrated in FIG. 6, with the dashed line representing the encrypted path between the client 112 and the client VM 124.

In optional step 914, after configuring the client VM 124 with its certificate 200, the client 112 can then obtain a unique identifier for the client VM 124 from the CCA 400. This identifier can be the UUID of the client VM 124 or the WWPN of the client VM 124 (assuming NPIV mode). The client 112 logs into the web portal 118 and then associates this identifier with the client's certificate 200 and the LUN. This association is kept in Client Crypto Domain on the encryption switch 130. This additional information provides for stricter checking at nexus establishment time, because the identifier can also be checked.

In step 916, the client VM 124 has all the required information to authenticate to the encryption switch 130 for access to the LUN and authenticates itself.

One aspect of the configuration process is that the client's private key never leaves the confines of the infrastructure he trusts, yet he is still provided a secure way to authenticate his access to the LUNs that contain his data. The private key is only persistently retained back at the client site 112, and it is non-persistently retained only in the context of the client VM 124. The combination of this process and the use of a fabric-based encryption device like the encryption switch 130 to facilitate this process are considered unique.

Figure 10:
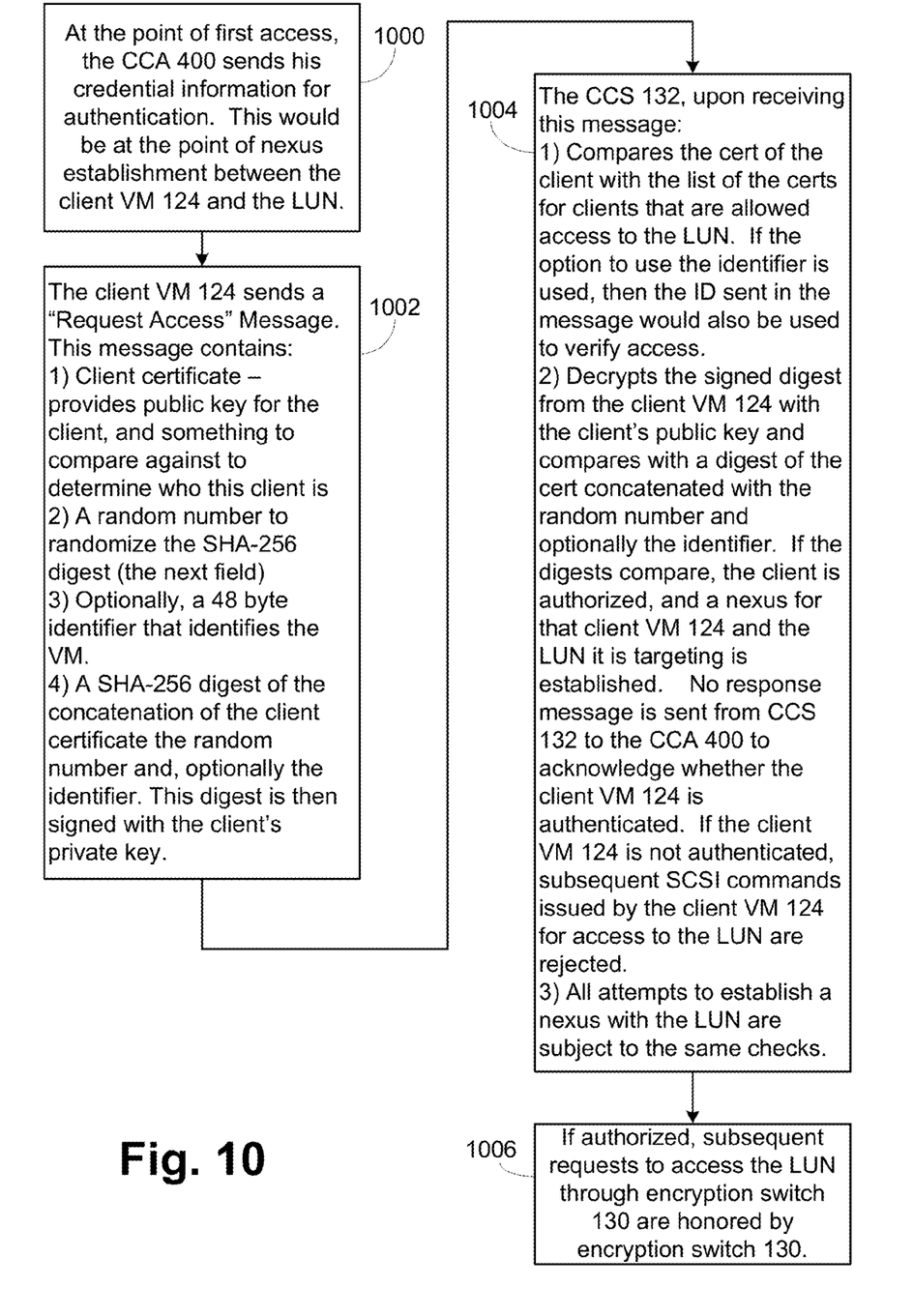
FIG. 10 is a flowchart of a client VM accessing the LUN according to the present invention.

Once the client VM 124 and the encryption switch 130 are configured, the steps for authenticating the client VM 124 access to the LUN are shown in FIG. 10.

When the client VM 124 first attempts to access the LUN, during its initial login stage, the CCA 400 communicates with the CCS 132 to perform an authentication handshake. For example, using X.509 certificates, a modified TLS handshake protocol can be used.

At step 1000, the point of first access, the CCA 400 sends the credential information for authentication. This would be at the point of nexus establishment between the client VM 124 and the LUN.

At step 1002 the client VM 124 sends a "Request Access" Message. This message contains: 1) client certificate, which provides public key for the client, and something to compare against to determine who this client is; 2) a random number to randomize the SHA-256 digest (the next field); 3) optionally, a 48 byte identifier that identifies the client VM 124; and 4) a SHA-256 digest of the concatenation of the client certificate, the random number and, optionally the identifier. This digest is then signed with the client's private key.

In step 1004, the CCS 132, upon receiving this message: 1) compares the certificate of the client VM 124 with the list of the certificates for clients that are allowed access to the LUN, noting that if the option to use the identifier is used, then the ID sent in the message would also be used to verify access; 2) decrypts the signed digest from the client VM 124 with the client's public key and compares with a digest of the certificate concatenated with the random number and optionally the identifier. If the digests compare, the client VM 124 is authorized, and a nexus for that client VM 124 and the LUN it is targeting is established, with no response message sent from CCS 132 to the CCA 400 to acknowledge whether the client is authenticated, but if the client VM 124 is not authenticated, subsequent SCSI commands issued by the client VM 124 for access to the LUN are rejected; and 3) all attempts to establish a nexus with the LUN are subject to the same checks.

In step 1006, if authorized, subsequent requests by the client VM 124 to access the LUN through the encryption switch 130 are honored by the encryption switch 130.

Figure 7:
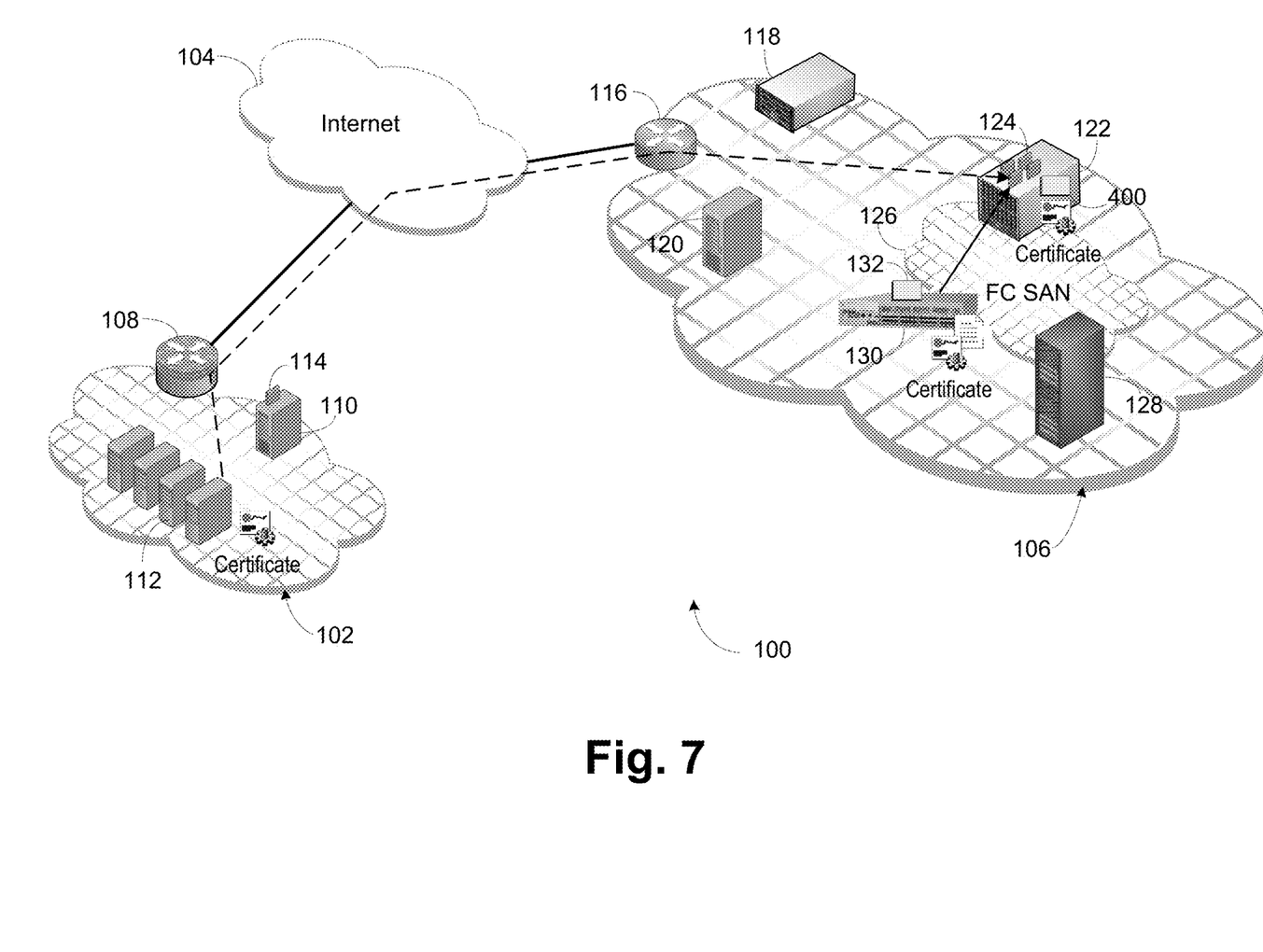
Figure 8:
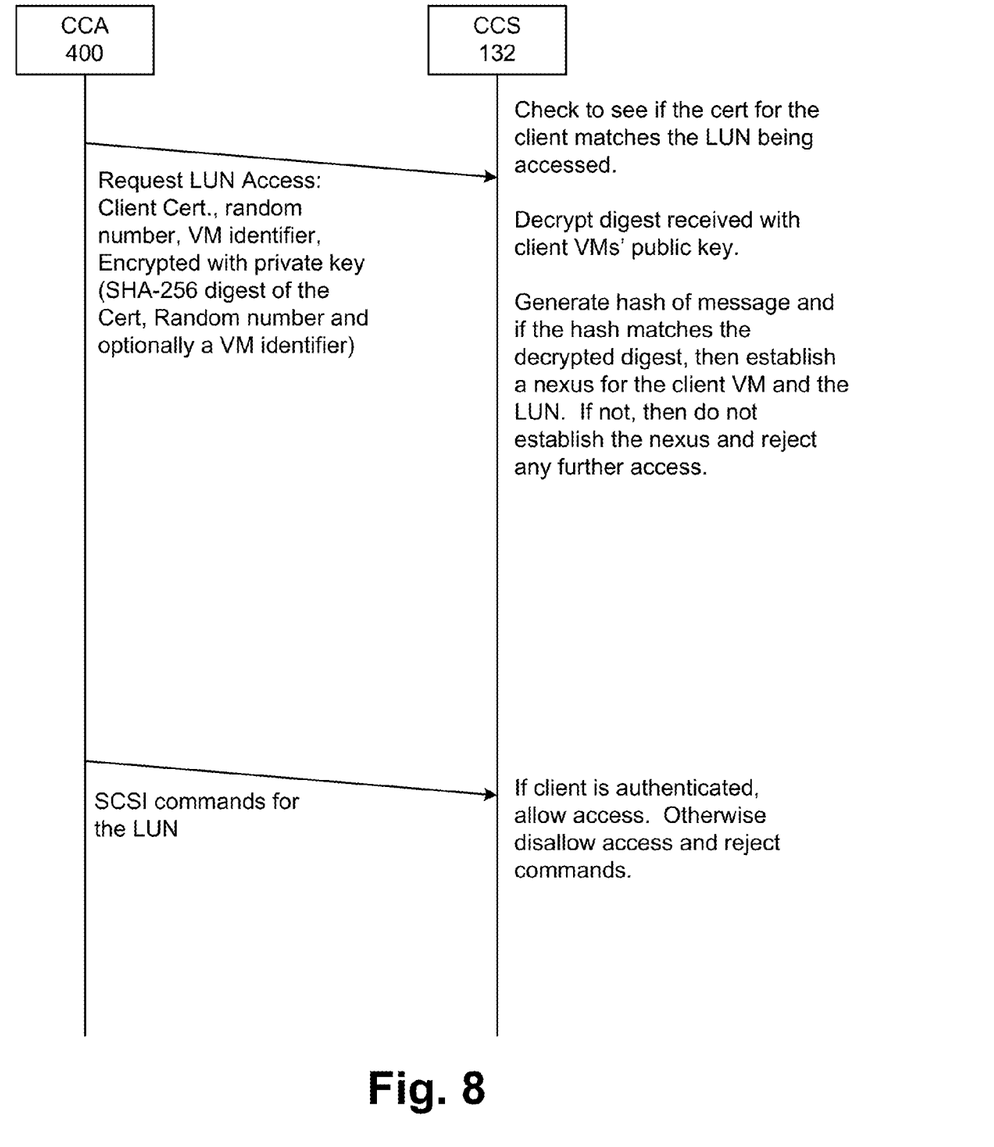
FIG. 8 is a ladder diagram of the sequence to access LUNs according to the present invention.

A simple ladder diagram is provided as FIG. 8 and the operation is illustrated in FIG. 7.

An aspect of the authentication process is the use of a fabric-based encryption device, like the encryption switch 130, to provide certificate-based LUN-level access control to clients, in particular to clients embodied as virtual machines at the client network. Since the authentication credentials are contained within the VM itself, the credentials move with the VM. This allows for authentication in the presence of VM mobility, allowing the VM to authenticate to its LUNs regardless of what server the VM executes on. Since only the client with the credentials may authenticate to the LUNs it owns, unauthorized access is denied.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A system comprising:
   a storage device including at least one logical unit number (LUN);
   a computer including at least one virtual machine, said virtual machine including authentication software and a private key of a client; and
   an encryption device interconnecting said storage device and said computer, said encryption device including authentication software and a certificate of the client, said encryption device allowing data transfer between said virtual machine and said at least one LUN based on authentication of the client private key and client certificate.

2. The system of claim 1, further comprising:
   a provisioning service coupled to said computer and said encryption device to create said virtual machine on said computer, configure said at least one LUN for access and provide said client certificate to said encryption device.

3. The system of claim 1, wherein said virtual machine further includes software to cooperate with the client to securely receive said client private key.

4. A method comprising:
   providing a logical unit number (LUN) for data storage;
   providing a virtual machine including authentication software and a private key of a client;
   providing an encryption device including authentication software and a certificate of the client; and
   using said encryption device to allow data transfer between said virtual machine and said LUN based on authentication of the client private key and client certificate.

5. The method of claim 4, further comprising:
   securely providing said client certificate to said encryption device.

6. The method of claim 4, further comprising:
   securely providing said client private key to said virtual machine.

7. A secure access system comprising:
   a computer readable storage medium containing computer instructions causing a computer to perform authentication and store a private key of a client; and
   an encryption device for interconnecting a storage device including at least one logical unit number (LUN) and a computer executing a virtual machine, the virtual machine for executing the computer instructions on said computer readable storage medium, said encryption device including authentication software and for storing a certificate of the client, said encryption device allowing data transfer between said virtual machine and said at least one LUN based on authentication of the client private key and client certificate.

8. The secure access system of claim 7, wherein said computer readable storage medium further includes computer instructions to cooperate with the client to securely receive the client private key.

* * * * *